United States Patent
Soens et al.

(10) Patent No.: US 7,259,202 B1
(45) Date of Patent: Aug. 21, 2007

(54) METHOD FOR PRE-TREATING STENCILS TO ENSURE PAINT REMOVAL

(76) Inventors: Maureen Soens, 831 Augusta Dr., Rochester Hills, MI (US) 48309; Ken Soens, 831 Augusta Dr., Rochester Hills, MI (US) 48309

( * ) Notice: Subject to any disclaimer, the term of this patent is extended or adjusted under 35 U.S.C. 154(b) by 113 days.

(21) Appl. No.: 10/818,110

(22) Filed: Apr. 5, 2004

Related U.S. Application Data

(60) Provisional application No. 60/462,146, filed on Apr. 10, 2003.

(51) Int. Cl.
| | |
|---|---|
| *C09D 11/16* | (2006.01) |
| *C09D 161/10* | (2006.01) |
| *C08K 5/36* | (2006.01) |
| *C08L 61/10* | (2006.01) |
| *G03G 13/06* | (2006.01) |
| *C11D 7/26* | (2006.01) |

(52) U.S. Cl. .................. 524/379; 524/86; 524/186; 524/47; 524/104; 523/161; 430/120; 430/110; 430/111; 430/109; 525/180; 525/181; 525/182; 525/183; 427/155; 427/156

(58) Field of Classification Search ............... 524/379, 524/47, 86, 186; 523/161; 427/155; 430/110, 430/111; 510/201, 211
See application file for complete search history.

(56) References Cited

U.S. PATENT DOCUMENTS

| | | | | | |
|---|---|---|---|---|---|
| 2,956,978 | A | * | 10/1960 | Ingwalson et al. ...... | 106/169.36 |
| 3,706,589 | A | * | 12/1972 | Fukuda et al. ............. | 427/154 |
| RE29,753 | E | * | 9/1978 | Williams .................... | 524/5 |
| 4,228,893 | A | * | 10/1980 | Franklin et al. ............ | 206/205 |
| 4,315,957 | A | * | 2/1982 | Hereth et al. .............. | 427/155 |
| 5,064,713 | A | * | 11/1991 | DuLaney et al. ........... | 428/214 |
| 5,604,074 | A | * | 2/1997 | Yasuda et al. .............. | 430/120 |
| 6,040,359 | A | * | 3/2000 | Santini et al. .............. | 523/161 |
| 6,140,303 | A | * | 10/2000 | Wrede et al. .................. | 512/2 |
| 6,191,087 | B1 | * | 2/2001 | Opre et al. ................. | 510/201 |
| 6,191,097 | B1 | * | 2/2001 | Lueder et al. .............. | 510/444 |
| 6,203,957 | B1 | * | 3/2001 | Nomura et al. ........... | 430/110.4 |
| 6,235,914 | B1 | * | 5/2001 | Steiger et al. .............. | 554/114 |
| 6,518,334 | B1 | * | 2/2003 | Calhoun et al. ............. | 524/47 |
| 2003/0134764 | A1 | * | 7/2003 | Hensley ..................... | 510/201 |

FOREIGN PATENT DOCUMENTS

GB  1058921  * 2/1967

* cited by examiner

*Primary Examiner*—Duane Smith
*Assistant Examiner*—Ives Wu
(74) *Attorney, Agent, or Firm*—Brouse McDowell; Daniel A. Thomson

(57) ABSTRACT

A new and improved method for pre-treating stencils is herein disclosed. A release agent provides a protective barrier when applied to stencils prior to applying paint to the surface. The release agent allows the paint to removed by soaking and/or washing the pre-treated surface with warm water.

18 Claims, No Drawings

METHOD FOR PRE-TREATING STENCILS TO ENSURE PAINT REMOVAL

This application claims priority to provisional patent application Ser. No. 60/462,146, entitled Method For Pre-Treating Stencils To Ensure Paint Removal, filed Apr. 10, 2003. This invention relates to the art of stencils, and more particularly to a paint release product, and even more particularly to a method for pre-treating stencils with a paint release product.

I. BACKGROUND OF THE INVENTION

A. Field of the Invention

B. Description of the Related Art

It is known in the art to desire the removal of paint from stencils, as well as finding a way to make stencil cleaning easier and to reduce time, effort, and frustration in cleaning stencils. Currently, there are numerous products on the market that claim to clean paint from stencils, but the inventors have found that these products are messy and do not adequately clean the stencils.

The present invention provides a new and improved paint release method, and overcomes certain difficulties inherent in the related inventions while providing better overall results.

II. SUMMARY OF THE INVENTION

In accordance with one aspect of the present invention, a polyvinyl acetate/polyethylene mixture is used as a paint release agent.

In accordance with another aspect of the present invention, the inventive method provides a protective barrier when applied to stencils.

In accordance with another aspect of the present invention, the inventive method reduces risk of damaging bridges from cleaning.

In accordance with still another aspect of the present invention, the paint release can be applied and left on a stencil for several days before beginning a project.

In accordance with yet another aspect of the present invention, the paint release is water-based.

In accordance with another aspect of the present invention, the release agent comprises approximately 36% polyvinyl acetate and polyethylene mixture, approximately 60% water, approximately 3% propylene glycol dibenzoate, approximately 1% propylene glycol, approximately 0.4% denatured ethanol, approximately 0.05% pure bitter orange extract, approximately 0.0029% insoluble magnesium silicates, and approximately 0.0017% copper phthalocyanine.

In accordance with another aspect of the present invention, the release agent comprises a base polymer, a plasticizer, a solvent vehicle, an emulsifier, a scent, and a dye.

In accordance with another aspect of the present invention, the release agent can be used in automotive applications.

In accordance with another aspect of the present invention, the inventive method can be used on any surface which the associated user wishes to be kept clean during the painting or coating process.

In accordance with another aspect of the present invention, a compound for pre-treating stencils includes 36% polyvinyl acetate/polyethylene mixture, 60% water, 3% propylene glycol dibenzoate, 1% propylene glycol, 0.4% denatured ethanol, 0.05% pure bitter orange extract, 0.0029% insoluble magnesium silicate, and 0.0017% copper phthalocyanine.

In accordance with another aspect of the present invention, a chemical compound includes a vinyl resin, a vinyl polymer, and a solvent.

In accordance with another aspect of the present invention, the vinyl resin is polyvinyl acetate and the vinyl polymer is polyethylene.

In accordance with another aspect of the present invention, the compound further includes an emulsifier.

In accordance with another aspect of the present invention, the compound further includes a second solvent vehicle, an alcohol, a dye, and a dye dispersant.

In accordance with another aspect of the present invention, the emulsifier is propylene glycol dibenzoate, the second solvent vehicle is propylene glycol, the alcohol is denatured ethanol, the dye is copper phthalocyanine, and the dye dispersant is insoluble magnesium silicates.

In accordance with another aspect of the present invention, the compound further includes orange extract, wherein the extract is terpineols with 70% as d-limonene.

In accordance with another aspect of the present invention, the compound further includes approximately 36% polyvinyl acetate and polyethylene mixture, approximately 60% solvent, and approximately 3% emulsifier.

In accordance with another aspect of the present invention, the compound further includes approximately 1% propylene glycol, approximately 0.4% denatured ethanol, approximately 0.0029% insoluble magnesium silicates, and approximately 0.0017% dye.

In accordance with another aspect of the present invention, the compound further includes approximately between 87% to 97% polyvinyl acetate and polyethylene mixture and approximately between 2% to 5% solvent.

In accordance with another aspect of the present invention, wherein the solvent is propylene glycol, and the compound further includes approximately between 0.2% to 0.6% denatured ethanol, approximately between 0.01% to 0.03% defoamer, approximately between 0.05% to 0.15% mildewcide, approximately between 0.005% to 0.015% cellulosic thickener, approximately between 0.05% to 0.15% 2-amino-2-methyl propanol, approximately between 0.005% to 0.15% phthalo blue dispersion, approximately between 0.3% to 0.7% attapulgite clay, and approximately between 0.03% to 0.07% orange extract.

In accordance with another aspect of the present invention, a method for pre-treating a surface to ensure coating removal includes the steps of applying a mixture of a vinyl resin, a vinyl polymer, and a solvent to the surface.

In accordance with another aspect of the present invention, applying a mixture of a vinyl resin, a vinyl polymer, and a solvent to the surface further includes the step of applying a mixture of polyvinyl acetate, polyethylene, propylene glycol, ethanol, and a defoamer to the surface.

In accordance with another aspect of the present invention, applying a mixture of a polyvinyl acetate, polyethylene, propylene glycol, ethanol, and a defoamer to the surface further includes the step of applying a mixture of a polyvinyl acetate, polyethylene, propylene glycol, ethanol, a defoamer, a mildewcide, a cellulosic thickener, 2-amino-2-methyl propanol, phthalo blue dispersion, attapulgite clay, and orange extract to the surface.

In accordance with another aspect of the present invention, applying a mixture of a polyvinyl acetate, polyethylene, propylene glycol, ethanol, a defoamer, a mildewcide, a cellulosic thickener, 2-amino-2-methyl propanol, phthalo blue dispersion, attapulgite clay, and orange extract to the surface further includes the step of applying a mixture of approximately 87% to 97% polyvinyl acetate and polyethylene, approximately 2% to 5% propylene glycol, approximately 0.2% to 0.6% denatured ethanol, approximately 0.01% to 0.03% defoamer, approximately 0.05% to 0.15% mildewcide, approximately 0.005% to 0.015% cellulosic thickener, approximately 0.05% to 0.15% 2-amino-2-methyl propanol, approximately 0.005% to 0.15% phthalo blue dispersion, approximately 0.3% to 0.7% attapulgite clay, and approximately 0.03% to 0.07% orange extract to the surface.

In accordance with another aspect of the present invention, the method further includes the step of allowing the mixture to dry on the surface.

In accordance with another aspect of the present invention, a method for removing a coating from a surface includes the steps of applying a mixture of a vinyl resin, a vinyl polymer, and a solvent to the surface, allowing the mixture to dry, and after at least some of the coating is applied on top of the dry mixture, rinsing the coating off with a liquid.

In accordance with another aspect of the present invention, rinsing the coating off with a liquid further includes the step of rinsing the coating off with warm water for at least 30 seconds.

In accordance with another aspect of the present invention, the method includes soaking the surface in a liquid to remove the coating.

In accordance with another aspect of the present invention, soaking the surface in a liquid to remove the coating further includes the step of soaking the surface in warm water for at least 10 minutes to remove the coating.

Still other benefits and advantages of the invention will become apparent to those skilled in the art upon a reading and understanding of the following detailed specification.

III. DESCRIPTION OF THE INVENTION

In one embodiment of this invention, the paint release agent provides a protective barrier when applied to stencils, in particular polyester film and brass stencils. Although this particular embodiment describes the invention with respect to stencils, it is to be understood that the method can be used with any surface wherein an adhered substance would need to be removed. The inventive method allows the paint to be removed with a simple water washing. It creates a surface for the stencil paint to adhere to while still allowing the polyester film to release the agent when warm water is applied.

In one embodiment of the inventive method, the release agent is applied to the surface of the stencil and allowed to dry. Once the agent is dry, the stencil can be used in the painting application. Once the project is finished, or a different color or product is desired, the user can run warm water over the stencil for approximately 30 seconds and gently rub the stencil clean. An alternative method is to soak the stencil in warm water for approximately 10 minutes and rinse the stencil clean. Once the paint and release agent have been washed off, the release can then be reapplied.

It is to be understood that although the above referenced method utilizes warm water, the temperature of the water is not critical to the invention. Any temperature or water, chosen using sound engineering judgment, can be used to remove the paint. It is also to be understood that the wash (30 seconds) and soak (10 minutes) times are merely embodiments of this invention, and are not intended to limit the invention. Any effective times may be used for the wash and soak. It is further to be understood that the use of water is only one embodiment of this invention, and that any effective chemical may be used to rinse the stencil.

In one embodiment of this invention, the release agent is a mixture of a base polymer, plasticizer, and solvent vehicle. In particular, in this embodiment, the release agent is polyvinyl acetate (base polymer) and polyethylene (plasticizer) mixture in water (solvent vehicle). When dried, this mixture allows for the easy removal of paint and other adherents upon rinsing.

EXAMPLE 1

36% polyvinyl acetate and polyethylene mixture (as base polymer and plasticizer respectively)

60% water (as a solvent vehicle)

3% propylene glycol dibenzoate (as an emulsifier and intermediate)

1% propylene glycol (as a solvent vehicle)

0.4% denatured ethanol (denatured with methanol and isopropanol as solvent vehicle)

0.05% pure bitter orange extract (terpineols with 70% as d-limonene)

0.0029% insoluble magnesium silicates (talc as a dye dispersant)

0.0017% copper phthalocyanine (as a dye)

In this embodiment, the polyethylene is approximately 5-10% of the total polymer. It is to be understood that the amounts in this Example are merely one embodiment of this invention, and are not intended to limit the invention. The base polymer, plasticizer, and solvent vehicle can be any synergistically effective amount.

EXAMPLE 2

87% to 97% vinyl acetate polymer (as base polymer and plasticizer respectively)

2% to 5% propylene glycol (as a solvent vehicle)

0.2% to 0.6% denatured ethanol (denatured with methanol and isopropanol as solvent vehicle)

0.01% to 0.03% defoamer 0.05% to 0.15% mildewcide 0.005% to 0.015% cellulosic thickener 0.05% to 0.15% 2-amino-2-methyl propanol (emulsifier)

0.005% to 0.15% phthalo blue dispersion (dye)

0.3% to 0.7% attapulgite clay (dye dispersant)

0.03% to 0.07% pure bitter orange extract

It is to be understood that the amounts in this Example are merely one embodiment of this invention, and are not intended to limit the invention. The base polymer, plasticizer, and solvent vehicle can be any synergistically effective amount.

In another embodiment of this invention, the release agent could be used in automotive applications. For example, some electrical components have a thin layer of brass, or other conductive metal, on them. A coating is often applied to this brass, and the current process requires additional time and effort to make sure that some of the brass remains open for electrical contact. The present invention would allow the user to coat part of the brass with the release agent, then apply the coating, then rinse off the release agent. This allows the coating to be applied, while maintaining the necessary brass electrical contact.

It is to be understood that the inventive process is not limited to stencils and automotive applications. The method may be used on any surface which the user wishes to keep free from whatever coating is being applied.

Other than in the operating examples, or where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

The invention has been described with reference to several embodiments. Obviously, modifications and alterations will occur to others upon a reading and understanding of the specification. It is intended by applicant to include all such modifications and alterations insofar as they come within the scope of the appended claims or the equivalents thereof.

What is claimed is:

1. A compound for pre-treating stencils, the compound comprising:
   36% polyvinyl acetate/polyethylene mixture;
   60% water;
   3% propylene glycol dibenzoate;
   1% propylene glycol;
   0.4% denatured ethanol;
   0.05% pure bitter orange extract;
   0.0029% insoluble magnesium silicate; and,
   0.0017% copper phthalocyanine.

2. A chemical compound comprising:
   approximately 36% polyvinyl acetate/polyethylene mixture;
   approximately 60% solvent;
   a dye;
   approximately 3% emulsifier;
   a dye dispersant; and,
   a scent extract.

3. The compound of claim 2, wherein the compound further comprises:
   a second solvent vehicle; and,
   an alcohol.

4. The compound of claim 3, wherein the emulsifier is propylene glycol dibenzoate, the second solvent vehicle is propylene glycol, the alcohol is denatured ethanol, the dye is copper phthalocyanine, and the dye dispersant is insoluble magnesium silicates.

5. A chemical compound comprising:
   polyvinyl acetate;
   polyethylene;
   a solvent;
   a second solvent vehicle, wherein the second solvent vehicle is propylene glycol dibenzoate;
   propylene glycol;
   denatured ethanol;
   copper phthalocyanine;
   insoluble magnesium silicates; and,
   terpineols with 70% as d-limonene.

6. The compound of claim 2, wherein the compound further comprises:
   approximately 1% propylene glycol;
   approximately 0.4% denatured ethanol;
   approximately 0.0029% dye dispersant, wherein the dye dispersant is insoluble magnesium silicates; and,
   approximately 0.0017% dye.

7. A chemical compound comprising:
   a dye;
   a dye dispersant;
   a scent extract;
   approximately between 87% to 97% polyvinyl acetate and polyethylene mixture; and,
   approximately between 2% to 5% solvent.

8. The compound of claim 7, wherein the solvent is propylene glycol, the compound further comprising:
   approximately between 0.2% to 0.6% denatured ethanol;
   approximately between 0.01% to 0.03% defoamer;
   approximately between 0.05% to 0.15% mildewcide;
   approximately between 0.005% to 0.015% cellulosic thickener;
   approximately between 0.05% to 0.15% 2-amino-2-methyl propanol;
   approximately between 0.005% to 0.15% dye, wherein the dye is phthalo blue dispersion;
   approximately between 0.3% to 0.7% dye dispersant, wherein the dye dispersant is attapulgite clay; and,
   approximately between 0.03% to 0.07% scent extract, wherein the scent extract is orange extract.

9. A method for pre-treating a surface to ensure coating removal, the method comprising the step of:
   applying a mixture of polyvinyl acetate, polyethylene, propylene glycol, ethanol, and a defoamer to the surface.

10. The method of claim 9, wherein applying a mixture of polyvinyl acetate, polyethylene, propylene glycol, ethanol, and a defoamer to the surface further comprises the step of:
    applying a mixture of polyvinyl acetate, polyethylene, propylene glycol, ethanol, a defoamer, a mildewcide, a cellulosic thickener, 2-amino-2-methyl propanol, phthalo blue dispersion, attapulgite clay, and orange extract to the surface.

11. The method of claim 10, wherein applying a mixture of polyvinyl acetate, polyethylene, propylene glycol, ethanol, a defoamer, a mildewcide, a cellulosic thickener, 2-amino-2-methyl propanol, phthalo blue dispersion, attapulgite clay, and orange extract to the surface further comprises the step of:
    applying a mixture of approximately 87% to 97% polyvinyl acetate and polyethylene, approximately 2% to 5% propylene glycol, approximately 0.2% to 0.6% denatured ethanol, approximately 0.01% to 0.03% defoamer, approximately 0.05% to 0.15% mildewcide, approximately 0.005% to 0.015% cellulosic thickener, approximately 0.05% to 0.15% 2-amino-2-methyl propanol, approximately 0.005% to 0.15% phthalo blue dispersion, approximately 0.3% to 0.7% attapulgite clay, and approximately 0.03% to 0.07% orange extract to the surface.

12. The method of claim 9, wherein the method further comprises the step of:
   allowing the mixture to dry on the surface.

13. The method of claim 12, the method further comprising the step of:
   after at least some of the coating is applied on top of the dry mixture, rinsing the coating off with a liquid.

14. The method of claim 13, wherein rinsing the coating off with a liquid further comprises the step of:
   rinsing the coating off with warm water for at least 30 seconds.

15. The method of claim 13, wherein the step of rinsing the coating off with a liquid is replaced by the step:
   soaking the surface in a liquid to remove the coating.

16. The method of claim 15, wherein soaking the surface in a liquid to remove the coating further comprises the step of:
   soaking the surface in warm water for at least 10 minutes to remove the coating.

17. The method of claim 13, wherein the surface is a stencil, and the coating is paint.

18. The method of claim 13, wherein the surface is a conductive metal.

* * * * *